US012592238B2

(12) United States Patent
    Itakura

(10) Patent No.: US 12,592,238 B2
(45) Date of Patent: Mar. 31, 2026

(54) INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

(71) Applicant: Panasonic Intellectual Property Corporation of America, Torrance, CA (US)

(72) Inventor: Kousuke Itakura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 180 days.

(21) Appl. No.: 18/653,631

(22) Filed: May 2, 2024

(65) Prior Publication Data

US 2024/0282313 A1    Aug. 22, 2024

Related U.S. Application Data

(63) Continuation of application No. PCT/JP2022/031711, filed on Aug. 23, 2022.

(30) Foreign Application Priority Data

Nov. 8, 2021    (JP) ................................. 2021-181745

(51) Int. Cl.
    *G06F 17/00*        (2019.01)
    *G10L 17/02*        (2013.01)
    *G10L 17/06*        (2013.01)

(52) U.S. Cl.
    CPC .............. *G10L 17/06* (2013.01); *G10L 17/02* (2013.01)

(58) Field of Classification Search
    CPC ................................ G10L 17/02; G10L 17/06

USPC ......................................................... 704/246
See application file for complete search history.

(56)                References Cited

U.S. PATENT DOCUMENTS

| | | | | |
|---|---|---|---|---|
| 7,231,350 | B2 * | 6/2007 | Gable | G10L 17/02 |
| | | | | 704/250 |
| 9,613,620 | B2 * | 4/2017 | Agiomyrgiannakis | ...................... |
| | | | | G10L 15/07 |
| 2020/0035247 | A1 * | 1/2020 | Boyadjiev | G06F 21/32 |

FOREIGN PATENT DOCUMENTS

| | | | |
|---|---|---|---|
| JP | 62-124599 | 6/1987 | |
| JP | 2021-033260 | 3/2021 | |
| WO | WO-9954868 A1 * | 10/1999 | ............. G10L 17/04 |

OTHER PUBLICATIONS

International Search Report issued in International Pat. Appl. No. PCT/JP2022/031711, dated Nov. 8, 2022, along with an English translation thereof.

* cited by examiner

*Primary Examiner* — Paul C Mccord

(74) *Attorney, Agent, or Firm* — Greenblum & Bernstein, P.L.C.

(57)                ABSTRACT

A speaker recognition device acquires a registered voice, converts the acquired registered voice to a plurality of property converted voices having respective acoustic properties different from each other, extracts a speaker feature indicative of a characteristic of a speaker from the registered voice, extracts a speaker feature from each of the property converted voices, compares all pairs of speaker features of a part or all of the speaker feature extracted from the registered voice and the speaker features extracted from the property converted voices, and calculates a threshold used for recognition of a speaker of an input voice on the basis of a result of the comparison.

11 Claims, 5 Drawing Sheets

FIG.2

| | SPEAKER FEATURE OF REGISTERED VOICE | SPEAKER FEATURE OF FIRST PROPERTY CONVERTED VOICE | SPEAKER FEATURE OF SECOND PROPERTY CONVERTED VOICE | ... |
|---|---|---|---|---|
| SPEAKER FEATURE OF REGISTERED VOICE | | 34.5 | 40.1 | ... |
| SPEAKER FEATURE OF FIRST PROPERTY CONVERTED VOICE | 34.5 | | 31.7 | ... |
| SPEAKER FEATURE OF SECOND PROPERTY CONVERTED VOICE | 40.1 | 31.7 | | ... |
| ... | ... | ... | ... | |

FIG.3

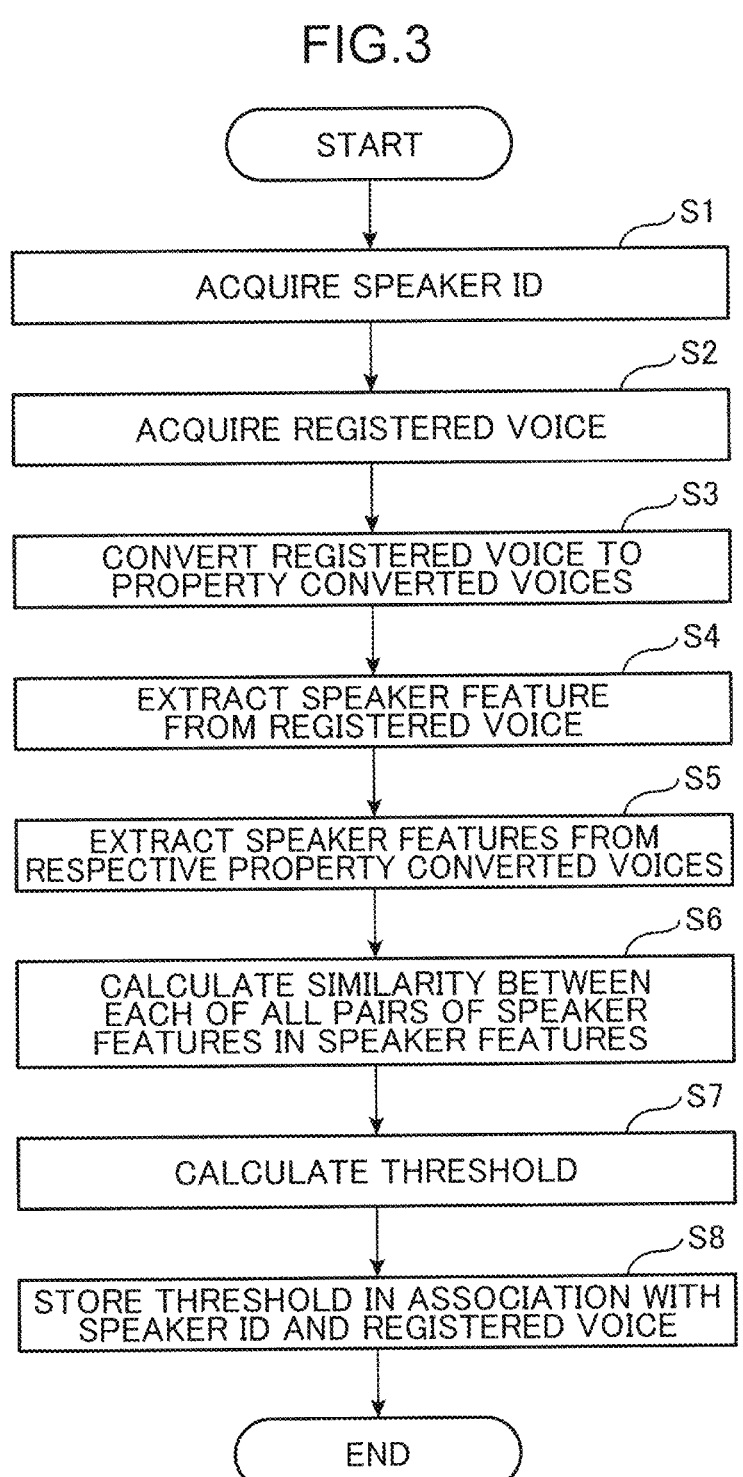

START

↓

ACQUIRE SPEAKER ID — S1

↓

ACQUIRE REGISTERED VOICE — S2

↓

CONVERT REGISTERED VOICE TO
PROPERTY CONVERTED VOICES — S3

↓

EXTRACT SPEAKER FEATURE
FROM REGISTERED VOICE — S4

↓

EXTRACT SPEAKER FEATURES FROM
RESPECTIVE PROPERTY CONVERTED VOICES — S5

↓

CALCULATE SIMILARITY BETWEEN
EACH OF ALL PAIRS OF SPEAKER
FEATURES IN SPEAKER FEATURES — S6

↓

CALCULATE THRESHOLD — S7

↓

STORE THRESHOLD IN ASSOCIATION WITH
SPEAKER ID AND REGISTERED VOICE — S8

↓

END

INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

FIELD OF INVENTION

The present disclosure relates to a technology for recognizing a speaker of an input voice by a comparison between the input voice and a registered voice.

BACKGROUND ART

For example, in a voice recognition device disclosed in Patent Literature 1, a plurality of modified voices reflecting different modifications of properties of a single voice are respectively registered in a plurality of voice recognition circuits, a voice that is input by a speaker is compared with each of the registered modified voices, and the recognition of the input voice is executed on the basis of the respective comparison results.

Further, for example, in a learning method of a speaker identification model disclosed in Patent Literature 2, a voice quality conversion process is executed on first voice data of a first speaker to thereby generate second voice data of a second speaker, and a learning process of the speaker identification model is executed using the first voice data and the second voice data as the learning data.

However, the conventional technologies described above hardly make it possible to attenuate degradation in the speaker recognition performance caused by a change in an acoustic property of an input voice of a speaker. Therefore, a further improvement has been demanded.

Patent Literature 1: Japanese Unexamined Patent Publication No. SHO 62-124599

Patent Literature 2: Japanese Unexamined Patent Publication No. 2021-33260

SUMMARY OF THE INVENTION

The present disclosure has been worked out in order to solve the problems described above, and an object thereof is to provide a technology which makes it possible to attenuate a degradation in a speaker recognition performance caused by a change in acoustic properties of an input voice of a speaker.

An information processing method according to the present disclosure includes, by a computer, acquiring a registered voice; converting the acquired registered voice to a plurality of property converted voices having respective acoustic properties different from each other; extracting a speaker feature indicative of a characteristic of a speaker from the registered voice; extracting a speaker feature from each of the property converted voices; comparing all pairs of speaker features of a part or all of the speaker feature extracted from the registered voice and the speaker features extracted from the property converted voices; and calculating a threshold used for recognition of a speaker of an input voice on the basis of a result of the comparison.

The present disclosure makes it possible to attenuate a degradation in a speaker recognition performance caused by a change in acoustic properties of an input voice of a speaker.

BRIEF DESCRIPTION OF THE DRAWINGS

FIG. 2 is a table showing an example of respective similarities between all pairs of speaker features in a plurality of speaker features in the embodiment.

FIG. 3 is a flowchart illustrating operations of a voice registration process in the speaker recognition device of the embodiment.

DETAILED DESCRIPTION

Knowledge Underlying the Present Disclosure

Figure 1:
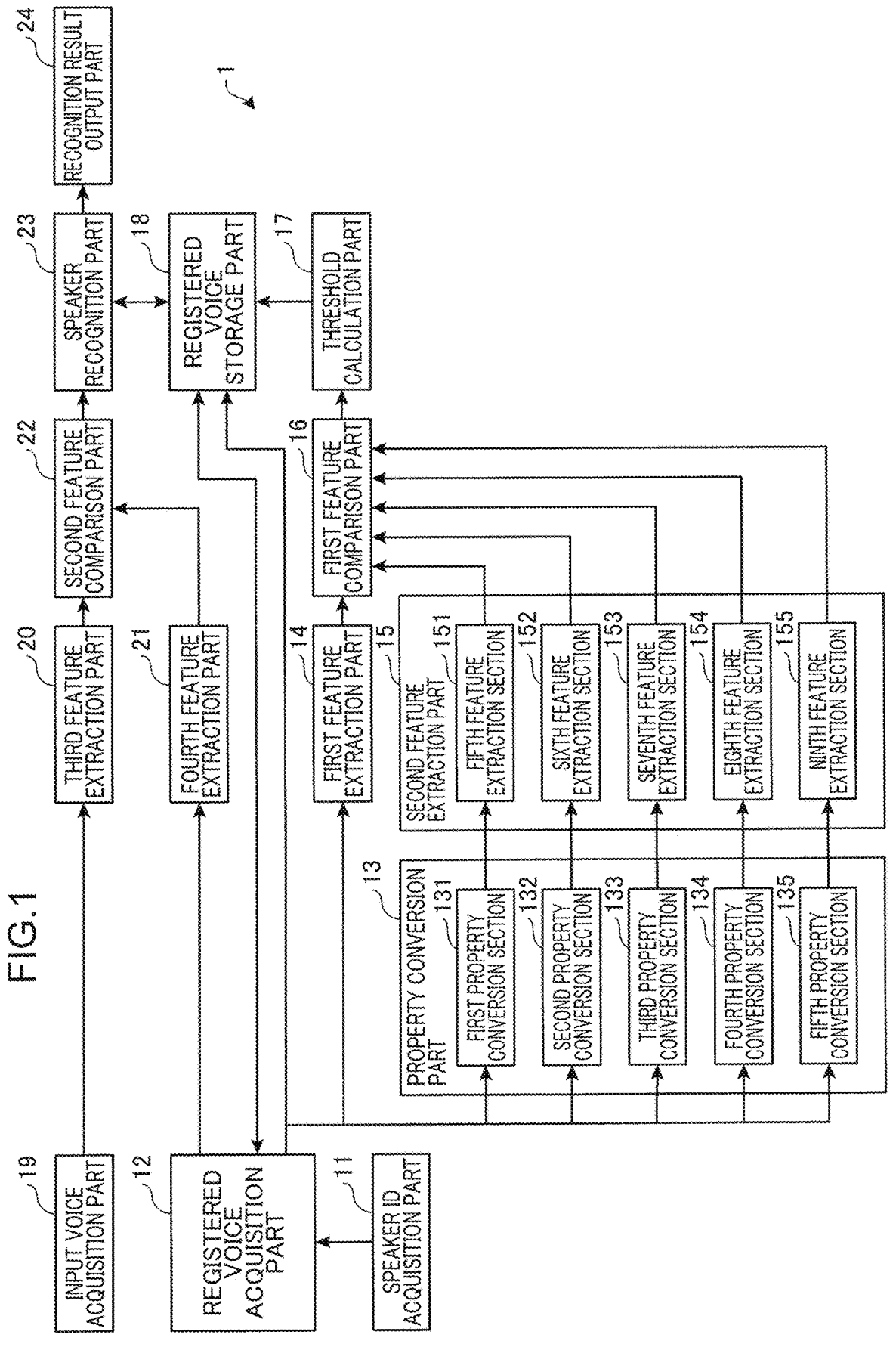
FIG. 1 is a block diagram showing a configuration of a speaker recognition device according to an embodiment of the present disclosure.

Even a voice uttered by the same person undergoes a change in characteristics thereof due to a change in physical condition such as the common cold. In a speaker recognition of recognizing a speaker on the basis of a human voice, if a characteristic of the voice changes due to a change in the physical condition, the voice is liable to be recognized to belong to a different speaker despite belonging to the same person as that of the voice registered in advance. In order to solve this problem, a speaker recognition method in consideration of the change in the voice due to the change in the physical condition has been demanded.

In the voice recognition device disclosed in the above-mentioned Patent Literature 1, when the voice registration is executed, a voice signal of a desired word that is a recognition target is input via a microphone, the input voice signal is branched and fed to a plurality of respective property modification circuits. The property modification circuits execute voice modifications to the signals in accordance with respective amplitudes and passband characteristics. The generated modified voice signals are stored in respective voice recognition circuits as registered voices. Further, when the voice recognition is executed, a voice signal is input via the microphone, the input voice signal is branched, and fed to respective voice recognition circuits through respective property modification circuits. Subsequently, the voice recognition circuits each execute voice pattern comparison between the input voice and the stored registered voice, and the voice recognition process is executed on the basis of comparison results in the respective voice recognition circuits.

However, if an input voice undergoes a change having not been covered by the property modification circuits, this voice recognition device can hardly recognize the input voice. Additionally, since the voice recognition device of Patent Literature 1 is an invention for a voice recognition of recognizing a voice, no consideration is given to identity judgment of a speaker in the speaker recognition of recognizing the speaker. Therefore, the technology of Patent Literature 1 hardly makes it possible to attenuate the degradation in the speaker recognition performance caused by a change in the acoustic properties of the input voice of the speaker.

Besides, in the learning process of the speaker identification model disclosed in the above-mentioned Patent Literature 2, the voice quality conversion process is executed to the first voice data of the first speaker to thereby generate the second voice data of the second speaker different from the first speaker for the purpose of augmenting the learning data of the speaker identification model. Thereafter, the learning process of the speaker identification model is executed using the first voice data and the second voice data as the learning data. Further, in the speaker identification process, voice data is input to the speaker identification model having been subjected to the learning process in advance, and the speaker identification information is output from the speaker identification model.

In the above-mentioned Patent Literature 2, the speaker identification model is set in the learning using the first voice data of the first speaker and the second voice data of the second speaker. Accordingly, if voice data of the first speaker having a changed acoustic property is input to the speaker identification model, the speaker identification model is liable to fail to judge the speaker of the voice data to be the first speaker but to judge the speaker to be a speaker different from the first speaker. Therefore, the technology of Patent Literature 2 hardly enables the attenuation of the degradation of a speaker recognition performance due to a change in the acoustic properties of the input voice of the speaker.

The following technology will be disclosed in order to solve the problem described above.

(1) An information processing method according to an aspect of the present disclosure includes, by a computer, acquiring a registered voice, converting the acquired registered voice to a plurality of property converted voices having respective acoustic properties different from each other, extracting a speaker feature indicative of a characteristic of a speaker from the registered voice, extracting a speaker feature from each of the property converted voices, comparing all pairs of speaker features of a part or all of the speaker feature extracted from the registered voice and the speaker features extracted from the property converted voices, and calculating a threshold used for recognition of a speaker of an input voice on the basis of a result of the comparison.

In this configuration, the registered voice is converted to a plurality of property converted voices having respective acoustic properties different from each other, all pairs of speaker features of a part or all of the speaker feature extracted from the registered voice and the speaker features extracted from the property converted voices are respectively compared therebetween, and a threshold used for recognition of a speaker of an input voice is calculated on the basis of a result of the comparison.

Therefore, even in the case that the similarity between the input voice and the registered voice decreases due to a change in an acoustic property of the input voice of the speaker, the determination as to whether the decrease in the similarity is within a tolerance corresponding to the change in the acoustic property can be made on the basis of the threshold. This makes it possible to attenuate degradation in the speaker recognition performance due to a change in acoustic properties of an input voice of a speaker.

(2) The information processing method disclosed in the above-mentioned (1) may further include storing the threshold in a memory in association with the registered voice, acquiring an input voice of a speaker who is a target of the recognition, acquiring the registered voice, extracting a speaker feature from the input voice, calculating a similarity between the speaker feature extracted from the input voice and the speaker feature extracted from the registered voice, and outputting a recognition result indicating that the speaker of the input voice agrees with the speaker of the registered voice when the calculated similarity is greater than the threshold stored in the memory.

In this configuration, the similarity between the speaker feature extracted from the input voice and the speaker feature extracted from the registered voice is calculated and the calculated similarity is compared with the threshold which is stored in advance. The threshold is calculated on the basis of the result of the comparison between each of all the pairs of speaker features of the part or all of the speaker feature extracted from the registered voice and the speaker features extracted from the property converted voices. Further, a recognition result indicating that the speaker of the input voice agrees with the speaker of the registered voice is output when the calculated similarity is greater than the threshold. Therefore, even in the case where an acoustic property of an input voice changes, an accurate recognition as to whether the speaker of the input voice agrees with the speaker of the registered voice can be executed.

(3) In the information processing method disclosed in the above-mentioned (1) or (2), it may be appreciated that, in the comparison of all the pairs of speaker features, a similarity between each of all the pairs of speaker features of the part or all of the speaker feature extracted from the registered voice and the speaker features extracted from the property converted voices is calculated, and in the calculation of the threshold, the threshold is calculated on the basis of the calculated similarities.

This configuration makes it possible to calculate a threshold using the similarity between each of all the pairs of speaker features of the part or all of the speaker feature extracted from the registered voice and the speaker features extracted from the property converted voices.

(4) In the information processing method disclosed in the above-mentioned (3), in the calculation of the threshold, the smallest similarity among the calculated similarities may be determined as the threshold.

This configuration makes it possible to determine whether the speaker of the input voice having a changed acoustic property is the same as the speaker of the registered voice using the smallest similarity among the similarities as the threshold in the speaker recognition.

(5) In the information processing method disclosed in the above-mentioned (3), in the calculation of the threshold, an average of the calculated similarities may be calculated as the threshold.

This configuration makes it possible to determine whether the speaker of the input voice having a changed acoustic property is the same as the speaker of the registered voice using the average of the calculated similarities as the threshold in the speaker recognition.

(6) In the information processing method disclosed in the above-mentioned (3), it may be appreciated that, in the calculation of the threshold, a cumulative distribution function $F(x)$ which indicates a probability of a similarity having a value x or smaller in the calculated similarities is calculated, and a value of a similarity which corresponds to a predetermined probability of the calculated cumulative distribution function $F(x)$ is calculated as the threshold.

This configuration makes it possible to determine whether the speaker of the input voice having the changed acoustic property is the same as the speaker of the registered voice using, as the threshold, the value of the similarity with which the cumulative distribution function $F(x)$, indicative of the probability of the similarity having the value x or smaller in the calculated similarities, gives the predetermined probability.

(7) In the information processing method disclosed in any one of the above-mentioned (1) to (6), the property converted voices may include a first property converted voice resulting from a conversion of a voice quality of the registered voice to a voice quality reflective of a common cold.

In this configuration, the threshold is calculated in consideration of the first property converted voice resulting from the conversion of the voice quality of the registered voice to a voice quality affected by the common cold. This makes it possible to improve the performance of a recognition as to whether a speaker of an input voice having a voice quality reflective of a common cold is the same as a speaker of a registered voice.

(8) In the information processing method disclosed in any one of the above-mentioned (1) to (6), the property converted voices may include a second property converted voice resulting from a conversion of an utterance content expressed by the registered voice to a different utterance content.

In this configuration, the threshold is calculated in consideration of the second property converted voice resulting from the conversion of the utterance content expressed by the registered voice to a different utterance content. This makes it possible to improve the performance of a recognition as to whether a speaker of an input voice having an utterance content different from that of a registered voice is the same as a speaker of a registered voice.

(9) In the information processing method disclosed in any one of the above-mentioned (1) to (6), the property converted voices may include a third property converted voice resulting from an addition of a noise to the registered voice.

In this configuration, the threshold is calculated in consideration of the third property converted voice resulting from the addition of the noise to the registered voice. This makes it possible to improve the performance of a recognition as to whether a speaker of an input voice including a noise is the same as a speaker of a registered voice.

(10) In the information processing method disclosed in any one of the above-mentioned (1) to (6), the property converted voices may include a fourth property converted voice resulting from a change of an utterance speed of the registered voice to a different utterance speed.

In this configuration, the threshold is calculated in consideration of the fourth property converted voice resulting from the change of the utterance speed of the registered voice to the different utterance speed. This makes it possible to improve the performance of a recognition as to whether a speaker of an input voice having an utterance speed different from that of a registered voice is the same as a speaker of a registered voice.

(11) In the information processing method disclosed in any one of the above-mentioned (1) to (6), the property converted voices may include a fifth property converted voice resulting from a conversion of a voice quality of the registered voice to a voice quality representing a certain emotion.

In this configuration, the threshold is calculated in consideration of the fifth property converted voice resulting from the conversion of the voice quality of the registered voice to the voice quality representing the certain emotion. This makes it possible to improve the performance of a recognition as to whether a speaker of an input voice uttered with a voice quality representing a certain emotion is the same as a speaker of a registered voice.

Further, the present disclosure may be accomplished not only as the information processing method for executing the characteristic process described above, but also as an information processing system including a characteristic configuration corresponding to the characteristic process executed in the information processing method. Additionally, the present disclosure may be accomplished as a computer program causing a computer to execute the characteristic process included in the information processing method. Therefore, the same advantageous effects as the information processing method can be established in the following embodiments.

(12) An information processing device according to another aspect of the present disclosure includes an acquisition part that acquires a registered voice, a conversion part that converts the acquired registered voice to a plurality of property converted voices having respective acoustic properties different from each other, a first extraction part that extracts a speaker feature indicative of a characteristic of a speaker from the registered voice, a second extraction part that extracts a speaker feature from each of the property converted voices, a comparison part that compares all pairs of speaker features of a part or all of the speaker feature extracted from the registered voice and the speaker features extracted from the property converted voices, and a calculation part that calculates a threshold used for recognition of a speaker of an input voice on the basis of a result of the comparison.

(13) An information processing program according to still another aspect of the present disclosure causes a computer to acquire a registered voice, convert the acquired registered voice to a plurality of property converted voices having respective acoustic properties different from each other, extract a speaker feature indicative of a characteristic of a speaker from the registered voice, extract a speaker feature from each of the property converted voices, compare all pairs of speaker features of a part or all of the speaker feature extracted from the registered voice and the speaker features extracted from the property converted voices, and calculate a threshold used for recognition of a speaker of an input voice on the basis of a result of the comparison.

(14) A non-transitory computer-readable recording medium according to still another aspect of the present disclosure which records the information processing program causes a computer to acquire a registered voice, convert the acquired registered voice to a plurality of property converted voices having respective acoustic properties different from each other, extract a speaker feature indicative of a characteristic of a speaker from the registered voice, extract a speaker feature from each of the property converted voices, compare all pairs of speaker features of a part or all of the speaker feature extracted from the registered voice and the speaker features extracted from the property converted voices, and calculate a threshold used for recognition of a speaker of an input voice on the basis of a result of the comparison.

Hereinafter, an embodiment of the present disclosure will be described with reference to the accompanied drawings. It should be noted that the below-described embodiment is a specific example of the present disclosure and will not delimit the technical scope of the present disclosure.

Embodiment

FIG. 1 is a block diagram showing a configuration of a speaker recognition device 1 according to an embodiment of the present disclosure.

The speaker recognition device 1 compares an input voice, which is a target of the recognition, with a registered voice stored in advance, and determines that the speaker of the input voice and the speaker of the registered voice are the same person when the input voice is similar to the registered voice.

The speaker recognition includes a speaker authentication (or a speaker verification) of comparing an input voice with a registered voice to thereby determine whether those belong to the same person and a speaker identification of comparing an input voice and each of a plurality of registered voices to thereby determine who among the speakers of the registered voices is the speaker of the input voice. The speaker recognition device 1 of the present embodiment mainly executes the speaker recognition, but is not limited thereto, and may also execute the speaker identification.

The speaker recognition device 1 includes a speaker ID acquisition part 11, a registered voice acquisition part 12, a property conversion part 13, a first feature extraction part 14, a second feature extraction part 15, a first feature comparison part 16, a threshold calculation part 17, a registered voice storage part 18, an input voice acquisition part 19, a third feature extraction part 20, a fourth feature extraction part 21, a second feature comparison part 22, a speaker recognition part 23, and a recognition result output part 24.

The speaker ID acquisition part 11, the registered voice acquisition part 12, the property conversion part 13, the first feature extraction part 14, the second feature extraction part 15, the first feature comparison part 16, the threshold calculation part 17, the input voice acquisition part 19, the third feature extraction part 20, the fourth feature extraction part 21, the second feature comparison part 22, the speaker recognition part 23, and the recognition result output part 24 are embodied by a processor. The processor includes, for example, a CPU (Central Processing Unit).

The registered voice storage part 18 is embodied by a memory. The memory includes, for example, ROM (Read Only Memory) or EEPROM (Electrically Erasable Programmable Read Only Memory).

The speaker recognition device 1 may be in, for example, a computer, a smartphone, a tablet type computer, or a server. Further, the speaker recognition device 1 may be incorporated in another device, e.g., an automotive navigation device and a household electric appliance.

The speaker recognition device 1 executes a voice registration process of registering in advance a voice of a speaker and a speaker recognition process of recognizing a speaker on the basis of an input voice. The speaker recognition device 1 may be switchable between the voice registration process and the speaker recognition process in response to an instruction from a user.

The speaker ID acquisition part 11 acquires a speaker ID for recognition of a speaker. In the voice registration process, the speaker ID acquisition part 11 acquires a speaker ID for recognition of a speaker who is a target of the registration. Further, in the speaker recognition process, the speaker ID acquisition part 11 acquires a speaker ID for recognition of a speaker who is a target of the recognition. For example, the speaker ID acquisition part 11 may be connected to an unillustrated camera. The camera may take an image of a barcode or a two-dimensional code which stores a speaker ID. The speaker ID acquisition part 11 may acquire the speaker ID from the image of the barcode or the two-dimensional code taken by the camera.

The speaker ID acquisition part 11 may be connected to an unillustrated IC card reader. The IC card reader may read information stored in an IC card contactlessly via NFC (Near Field Communication). The IC card stores a speaker ID in advance. A speaker places an IC card storing a speaker ID thereof in the proximity of the IC card reader. This allows the IC card reader to acquire the speaker ID from the IC card placed in the proximity thereof. The speaker ID acquisition part 11 may acquire a speaker ID from the IC card reader.

Further, the speaker ID acquisition part 11 may be connected to an input device, e.g., an unillustrated keyboard or touch screen. The input device may receive an input of a speaker ID by a speaker. The speaker ID acquisition part 11 may acquire the speaker ID input by the speaker from the input device.

In the voice registration process or the speaker recognition process, the speaker ID acquisition part 11 outputs the acquired speaker ID to the registered voice acquisition part 12.

The registered voice acquisition part 12 acquires a registered voice. The registered voice acquisition part 12 may be connected to an unillustrated microphone. The microphone collects a voice uttered by the speaker, converts the voice to voice data, and outputs the same to the speaker recognition device 1. In the voice registration process, the microphone outputs the registered voice uttered by the speaker who is the target of the registration to the speaker recognition device 1.

In the voice registration process, the registered voice acquisition part 12 acquires the registered voice of the speaker who is the target of the registration via the microphone. The registered voice acquisition part 12 stores the acquired registered voice in the registered voice storage part 18 in association with the speaker ID acquired by the speaker ID acquisition part 11. Further, in the voice registration process, the registered voice acquisition part 12 outputs the acquired registered voice to the first feature extraction part 14 and the property conversion part 13.

In a case that the registered voice of the speaker who is the target of the registration is stored in the registered voice storage part 18 in advance, the registered voice acquisition part 12 may acquire the registered voice from the registered voice storage part 18 in the voice registration process. Alternatively, in the voice registration process, the registered voice acquisition part 12 may acquire the registered voice from another external device, e.g., a smartphone, a tablet type computer, or a personal computer.

Further, in the speaker recognition process, the registered voice acquisition part 12 acquires the registered voice associated with the speaker ID acquired by the speaker ID acquisition part 11 from the registered voice storage part 18. In the speaker recognition process, the registered voice acquisition part 12 outputs the acquired registered voice to the fourth feature extraction part 21.

The property conversion part 13 converts the registered voice acquired by the registered voice acquisition part 12 to a plurality of property converted voices having respective acoustic properties different from each other. The property conversion part 13 includes a first property conversion section 131, a second property conversion section 132, a third property conversion section 133, a fourth property conversion section 134, and a fifth property conversion section 135.

The first property conversion section 131 generates a first property converted voice resulting from a conversion of a voice quality of the registered voice to a voice quality reflective of a common cold. For example, the first property conversion section 131 converts the registered voice to the first property converted voice having a hoarse voice quality. The first property conversion section 131 is implemented by a voice quality conversion model which machine-learns so as to convert, upon an input of a voice, a voice quality of the input voice to a voice quality affected by a common cold and output the same as the first property converted voice. The voice conversion model is, for example, a neural network model. The voice quality conversion model is generated through machine learning by using a voice uttered by a person in a normal condition and a voice uttered by the person having the voice quality affected by the common cold as training data and using the voice in the normal condition as an input and the voice having the voice quality affected by the common cold as an output.

The machine learning includes, for example, supervised learning for learning the relationship between input and output by using training data in which a label (output information) is given to input information, unsupervised learning for constructing a structure of data only from an unlabeled input, semi-supervised learning for handling both the labeled and the unlabeled, and reinforcement learning for learning, on a trial-and-error basis, a behavior that maximizes reward. Specific methods of machine learning include a neural network (including deep learning using a multilayer neural network), genetic programming, a decision tree, a Bayesian network, and support vector machine (SVM). In machine learning of a voice quality conversion model, any of the above specific examples may be used.

The second property conversion section 132 generates a second property converted voice resulting from a conversion of an utterance content of a registered voice to a different utterance content. For example, if the utterance content of the registered voice is "Good morning", the second property conversion section 132 converts the utterance content of the registered voice to a second property converted voice having a different utterance content "Hello". The second property conversion section 132 is implemented by a voice quality conversion model which machine-learns so as to convert, upon an input of a voice, an utterance content of the input voice to a different utterance content and output the same as the second property converted voice. The voice conversion model is, for example, a neural network model. The voice quality conversion model is generated through machine learning by using a voice of a person uttering a first wording and a voice of the person uttering a second wording different from the first wording as training data and using the voice of the first wording as the input and the voice of the second wording as the output. In the machine learning of the utterance content conversion model, one of the specific examples listed above may be used.

The third property conversion section 133 generates a third property converted voice resulting from an addition of a noise to the registered voice. The noise is, for example, environmental sound, e.g., vehicle passing sound and rain sound. The noise is stored in advance in the memory in the speaker recognition device 1. The third property conversion section 133 reads the noise from the memory and adds the read noise to the registered voice to thereby generate the third property converted voice.

The fourth property conversion section 134 generates a fourth property converted voice resulting from a conversion of an utterance speed of the registered voice to a different utterance speed. For example, the fourth property conversion section 134 generates a fourth property converted voice resulting from the conversion of the utterance speed of the registered voice from a first speed to a second speed higher than the first speed. Alternatively, the fourth property conversion section 134 may generate a fourth property converted voice resulting from the conversion of the utterance speed of the registered voice from the first speed to a third speed lower than the first speed.

The fifth property conversion section 135 generates a fifth property converted voice resulting from a conversion of a voice quality of the registered voice to a voice quality representing a certain emotion. For example, the fifth property conversion section 135 converts the voice quality of the registered voice to a fifth property converted voice having a voice quality representing an emotion of joy, a voice quality representing an emotion of anger, or a voice quality representing an emotion of sadness. The fifth property conversion section 135 is implemented by a voice quality conversion model which machine-learns so as to convert, upon an input of a voice, a voice quality of the input voice to the voice quality representing the emotion of joy, the voice quality representing the emotion of anger, or the voice quality representing the emotion of sadness and output the same as the fifth property converted voice. The voice conversion model is, for example, a neural network model. The voice quality conversion model is generated through machine learning by using a voice uttered by a person in a normal state and a voice uttered by the person in a state of joy, in a state of anger, or in a state of sadness as the training data and using the voice uttered in the normal state as the input and the voice uttered by the person in the state of joy, in the state of anger, or in the state of sadness as the output. In the machine learning of the voice quality conversion model, any of the above specific examples may be used.

In the present embodiment, five property converted voices having different acoustic properties are generated by the first property conversion section 131 to the fifth property conversion section 135. However, the present disclosure is not limited thereto, and four of the first property converted voice to the fifth property converted voice or fewer may be generated. Further, another property converted voice different from the first property converted voice to the fifth property converted voice may be generated, and six or more property converted voices may be generated.

The first feature extraction part 14 extracts a speaker feature indicative of a characteristic of the speaker from the registered voice acquired by the registered voice acquisition part 12. The speaker feature is, for example, in the form of an i-vector. The i-vector represents a feature in the form of a low-dimensional vector which is extracted from voice data through factor analysis of GMM (Gaussian Mixture Model)-supervector. Since the i-vector extraction technique pertains to a prior art, a detailed description thereof will be omitted. The speaker feature is not limited to be in the form of an i-vector but may be a feature in another form such as an x-vector. The first feature extraction part 14 outputs the speaker feature extracted from the registered voice to the first feature comparison part 16.

The second feature extraction part 15 extracts a speaker feature from each of the property converted voices converted by the property conversion part 13. The speaker feature is, for example, in the form of an i-vector. The second feature extraction part 15 includes a fifth feature extraction section 151, a sixth feature extraction section 152, a seventh feature extraction section 153, an eighth feature extraction section 154, and a ninth feature extraction section 155.

The fifth feature extraction section 151 extracts a speaker feature from the first property converted voice converted by the first property conversion section 131. The fifth feature extraction section 151 outputs the speaker feature extracted from the first property converted voice to the first feature comparison part 16.

The sixth feature extraction section 152 extracts a speaker feature from the second property converted voice converted by the second property conversion section 132. The sixth feature extraction section 152 outputs the speaker feature extracted from the second property converted voice to the first feature comparison part 16.

The seventh feature extraction section 153 extracts a speaker feature from the third property converted voice converted by the third property conversion section 133. The seventh feature extraction section 153 outputs the speaker feature extracted from the third property converted voice to the first feature comparison part 16.

The eighth feature extraction section 154 extracts a speaker feature from the fourth property converted voice converted by the fourth property conversion section 134. The eighth feature extraction section 154 outputs the speaker feature extracted from the fourth property converted voice to the first feature comparison part 16.

The ninth feature extraction section 155 extracts a speaker feature from the fifth property converted voice converted by the fifth property conversion section 135. The ninth feature extraction section 155 outputs the speaker feature extracted from the fifth property converted voice to the first feature comparison part 16.

The first feature comparison part 16 compares all pairs of speaker features of a part or all of the speaker feature extracted from the registered voice and the speaker features extracted from the property converted voices. More specifically, the first feature comparison part 16 calculates a similarity between each of all the pairs of speaker features of the part or all of the speaker feature extracted from the registered voice and the speaker features extracted from the property converted voices.

The first feature comparison part 16 calculates the similarity using a Probabilistic Linear Discriminant Analysis (PLDA)-based model. The PLDA model makes it possible to automatically select features which are valid for speaker recognition among features in the form of 400-dimensional i-vectors and calculate a log-likelihood ratio thereof as the similarity.

In the present embodiment, the first feature comparison part 16 calculates a similarity between each of all the pairs of speaker features of all of the speaker feature extracted from the registered voice and the speaker features extracted from the property converted voices.

FIG. 2 is a table showing an example of respective similarities between all pairs of speaker features in a plurality of speaker features in the embodiment.

As shown in FIG. 2, the similarity between the speaker feature of the registered voice and the speaker feature of the first property converted voice is 34.5, the similarity between the speaker feature of the registered voice and the speaker feature of the second property converted voice is 40.1, and the similarity between the speaker feature of the first property converted voice and the speaker feature of the second property converted voice is 31.7.

Apart from the similarities shown in FIG. 2, the first feature comparison part 16 calculates the similarity between the speaker feature of the registered voice and the speaker feature of the third property converted voice, the similarity between the speaker feature of the registered voice and the speaker feature of the fourth property converted voice, the similarity between the speaker feature of the registered voice and the speaker feature of the fifth property converted voice, the similarity between the speaker feature of the first property converted voice and the speaker feature of the third property converted voice, the similarity between the speaker feature of the first property converted voice and the speaker feature of the fourth property converted voice, the similarity between the speaker feature of the first property converted voice and the speaker feature of the fifth property converted voice, the similarity between the speaker feature of the second property converted voice and the speaker feature of the third property converted voice, the similarity between the speaker feature of the second property converted voice and the speaker feature of the fourth property converted voice, the similarity between the speaker feature of the second property converted voice and the speaker feature of the fifth property converted voice, the similarity between the speaker feature of the third property converted voice and the speaker feature of the fourth property converted voice, the similarity between the speaker feature of the third property converted voice and the speaker feature of the fifth property converted voice, the similarity between the speaker feature of the fourth property converted voice and the speaker feature of the fifth property converted voice.

The threshold calculation part 17 calculates a threshold used for recognition of the speaker of the input voice on the basis of a comparison result by the first feature comparison part 16. More specifically, the threshold calculation part 17 calculates the threshold on the basis of the similarities calculated by the first feature comparison part 16. The threshold calculation part 17 calculates the smallest similarity among the similarities calculated by the first feature comparison part 16 as the threshold. The threshold calculation part 17 stores the calculated threshold in the registered voice storage part 18 in association with the registered voice.

The registered voice storage part 18 stores the speaker ID, the registered voice, and the threshold in association with one another.

The input voice acquisition part 19 acquires an input voice of a speaker who is a target of the recognition. The input voice acquisition part 19 may be connected to an unillustrated microphone. In the speaker recognition process, the microphone outputs a voice uttered by the speaker who is the target of the recognition to the speaker recognition device 1. In the speaker recognition process, the input voice acquisition part 19 acquires the input voice of the speaker who is the target of the recognition via the microphone. The input voice acquisition part 19 outputs the acquired input voice to the third feature extraction part 20. The wording of the input voice may be different from the wording of the registered voice, or may be the same as the wording of the registered voice.

In the speaker recognition process, the third feature extraction part 20 extracts a speaker feature from the input voice acquired by the input voice acquisition part 19. The speaker feature is, for example, in the form of an i-vector.

In the speaker recognition process, the fourth feature extraction part 21 extracts the speaker feature from the registered voice acquired by the registered voice acquisition part 12. The speaker feature is, for example, in the form of an i-vector.

The second feature comparison part 22 calculates the similarity between the speaker feature extracted from the input voice and the speaker feature extracted from the registered voice. The way of calculating the similarity by the second feature comparison part 22 is the same as the way of calculating the similarity by the first feature comparison part 16.

The speaker recognition part 23 determines whether the similarity calculated by the second feature comparison part 22 is greater than the threshold stored in the registered voice storage part 18 to thereby determine whether the speaker of the input voice agrees with the speaker of the registered voice. The speaker recognition part 23 determines that the speaker of the input voice agrees with the speaker of the registered voice when the similarity calculated by the second feature comparison part 22 is greater than the threshold stored in the registered voice storage part 18. On the other hand, the speaker recognition part 23 determines that the speaker of the input voice does not agree with the speaker of the registered voice when the similarity calculated by the second feature comparison part 22 is equal to or smaller than the threshold stored in the registered voice storage part 18.

The recognition result output part 24 outputs a recognition result indicating whether the speaker of the input voice agrees with the speaker of the registered voice or not. The recognition result output part 24 outputs a recognition result indicating that the speaker of the input voice agrees with the speaker of the registered voice when the similarity calculated by the second feature comparison part 22 is greater than the threshold stored in the registered voice storage part 18. On the other hand, the recognition result output part 24 outputs a recognition result indicating that the speaker of the input voice does not agree with the speaker of the registered voice when the similarity calculated by the second feature comparison part 22 is equal to or smaller than the threshold stored in the registered voice storage part 18.

The recognition result output part 24 may output the recognition result to an output device. The output device includes, for example, a display or a speaker. The output device may output a message indicating that the speaker of the input voice who is the target of the recognition is the speaker registered in advance when the speaker of the input voice who is the target of the recognition is recognized. On the other hand, the output device may output a message indicating that the speaker of the input voice who is the target of the recognition is not the speaker registered in advance when the speaker of the input voice who is the target of the recognition is not recognized. Further, the recognition result output part 24 may output the recognition result by the speaker recognition part 23 to a device different from the speaker recognition device 1.

Hereinafter, operations of the voice registration process in the speaker recognition device 1 according to the embodiment will be described.

FIG. 3 is a flowchart illustrating the operations of the voice registration process in the speaker recognition device 1 of the embodiment.

First, in Step S1, the speaker ID acquisition part 11 acquires a speaker ID for recognition of a speaker who is a target of the registration. The speaker ID acquisition part 11 outputs the acquired speaker ID to the registered voice acquisition part 12.

Next, in Step S2, the registered voice acquisition part 12 acquires the registered voice of the speaker who is the target of the registration via the microphone. The registered voice acquisition part 12 outputs the acquired registered voice to the first feature extraction part 14 and the property conversion part 13.

Next, in Step S3, the property conversion part 13 converts the registered voice acquired by the registered voice acquisition part 12 to a plurality of property converted voices having respective acoustic properties different from each other. The first property conversion section 131 here generates a first property converted voice resulting from a conversion of a voice quality of the registered voice to a voice quality reflective of a common cold. The second property conversion section 132 generates a second property converted voice resulting from a conversion of an utterance content of a registered voice to a different utterance content. The third property conversion section 133 generates a third property converted voice resulting from an addition of a noise to the registered voice. The fourth property conversion section 134 generates a fourth property converted voice resulting from a conversion of an utterance speed of the registered voice to a different utterance speed. The fifth property conversion section 135 generates a fifth property converted voice resulting from a conversion of a voice quality of the registered voice to a voice quality representing a different emotion. The property conversion part 13 outputs the property converted voices (the first property converted voice to the fifth property converted voice) resulting from the conversions of the registered voice.

Next, in Step S4, the first feature extraction part 14 extracts a speaker feature from the registered voice acquired by the registered voice acquisition part 12. The first feature extraction part 14 outputs the speaker feature extracted from the registered voice to the first feature comparison part 16.

Next, in Step S5, the second feature extraction part 15 extracts speaker features from the respective property converted voices converted by the property conversion part 13. The fifth feature extraction section 151 here extracts a speaker feature from the first property converted voice converted by the first property conversion section 131. The sixth feature extraction section 152 extracts a speaker feature from the second property converted voice converted by the second property conversion section 132. The seventh feature extraction section 153 extracts a speaker feature from the third property converted voice converted by the third property conversion section 133. The eighth feature extraction section 154 extracts a speaker feature from the fourth property converted voice converted by the fourth property conversion section 134. The ninth feature extraction section 155 extracts a speaker feature from the fifth property converted voice converted by the fifth property conversion section 135. The second feature extraction part 15 outputs speaker features extracted from the respective property converted voices (the first property converted voice to the fifth property converted voice) to the first feature comparison part 16.

Next, in Step S6, the first feature comparison part 16 calculates a similarity between each of all the pairs of the speaker features extracted from the registered voice and the property converted voices.

Next, in Step S7, the threshold calculation part 17 calculates a threshold on the basis of the similarities calculated by the first feature comparison part 16. The threshold calculation part 17 here calculates the smallest similarity among the similarities calculated by the first feature comparison part 16 as the threshold.

Next, in Step S8, the threshold calculation part 17 stores the calculated threshold in the registered voice storage part 18 in association with the speaker ID and the registered voice.

In this embodiment, the first feature comparison part 16 calculates a similarity between each of all the pairs of speaker features of all of the speaker feature extracted from the registered voice and the speaker features extracted from the property converted voices. However, the present disclosure is not limited thereto. The first feature comparison part 16 may calculate a similarity between each of all the pairs of speaker features of a part of the speaker feature extracted from the registered voice and the speaker features extracted from the property converted voices. The first feature comparison part 16 may randomly select a part of the speaker feature extracted from the registered voice and the speaker features extracted from the property converted voices.

In this embodiment, the first feature comparison part 16 may calculate respective similarities between the speaker feature extracted from the registered voice and each of the speaker features extracted from the property converted voices. In other words, the first feature comparison part 16 may calculate the similarity between the speaker feature of the registered voice and the speaker feature of the first property converted voice, the similarity between the speaker feature of the registered voice and the speaker feature of the second property converted voice, the similarity between the speaker feature of the registered voice and the speaker feature of the third property converted voice, the similarity between the speaker feature of the registered voice and the speaker feature of the fourth property converted voice, and the similarity between the speaker feature of the registered voice and the speaker feature of the fifth property converted voice.

Further, in this embodiment, the first feature comparison part 16 may calculate a similarity between each of all the pairs of speaker features of all the speaker features extracted from the property converted voices. In other words, the first feature comparison part 16 may calculate the similarity between the speaker feature of the first property converted voice and the speaker feature of the second property converted voice, the similarity between the speaker feature of the first property converted voice and the speaker feature of the third property converted voice, the similarity between the speaker feature of the first property converted voice and the speaker feature of the fourth property converted voice, the similarity between the speaker feature of the first property converted voice and the speaker feature of the fifth property converted voice, the similarity between the speaker feature of the second property converted voice and the speaker feature of the third property converted voice, the similarity between the speaker feature of the second property converted voice and the speaker feature of the fourth property converted voice, the similarity between the speaker feature of the second property converted voice and the speaker feature of the fifth property converted voice, the similarity between the speaker feature of the third property converted voice and the speaker feature of the fourth property converted voice, the similarity between the speaker feature of the third property converted voice and the speaker feature of the fifth property converted voice, the similarity between the speaker feature of the fourth property converted voice and the speaker feature of the fifth property converted voice.

Further, in this embodiment, the first feature comparison part 16 may calculate a similarity between each of all the pairs of speaker features of a part of the speaker features extracted from the property converted voices.

In this embodiment, the threshold calculation part 17 calculates the smallest similarity among the similarities calculated by the first feature comparison part 16 as the threshold. However, the present disclosure is not limited thereto. The threshold calculation part 17 may calculate an average of the similarities calculated by the first feature comparison part 16 as the threshold.

The threshold calculation part 17 may calculate a cumulative distribution function $F(x)$ which indicates a probability of a similarity having a value $x$ or smaller in the similarities calculated by the first feature comparison part 16 and calculate a value of a similarity which corresponds to a predetermined probability of the calculated cumulative distribution function $F(x)$ as the threshold.

Figure 4:
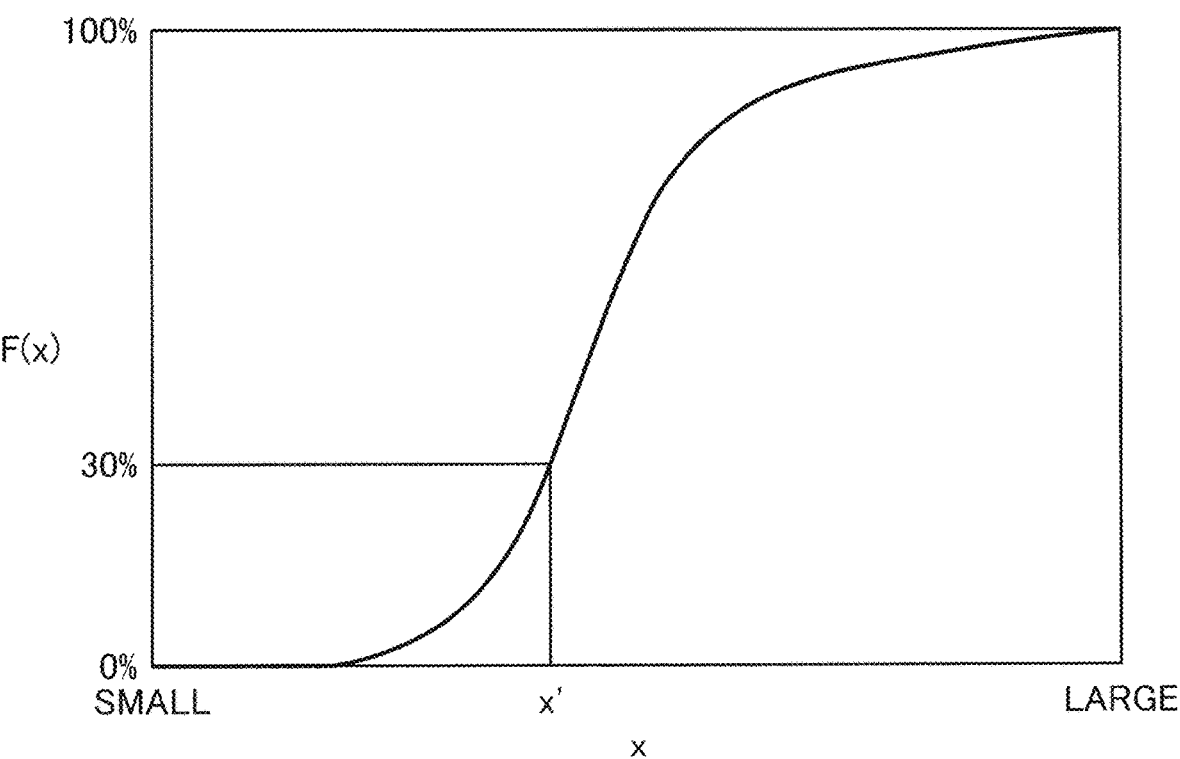
FIG. 4 is a graph showing an exemplary cumulative distribution function F(x) calculated about a plurality of similarities.

FIG. 4 is a graph showing an exemplary cumulative distribution function $F(x)$ calculated about a plurality of similarities. In FIG. 4, the vertical axis represents a cumulative probability (0 to 100%), and the horizontal axis represents a random variable (a value of the similarity).

For example, the threshold calculation part 17 may calculate, as the threshold, a value $x'$ of the similarity with which the calculated cumulative distribution function $F(x)$ gives a 30%. The threshold calculation part 17 may calculate, as the threshold, a value $x'$ of the similarity with which the calculated cumulative distribution function $F(x)$ gives any probability in a range of 20% to 40%.

Hereinafter, operations of the speaker recognition process in the speaker recognition device 1 according to the embodiment will be described.

Figure 5:
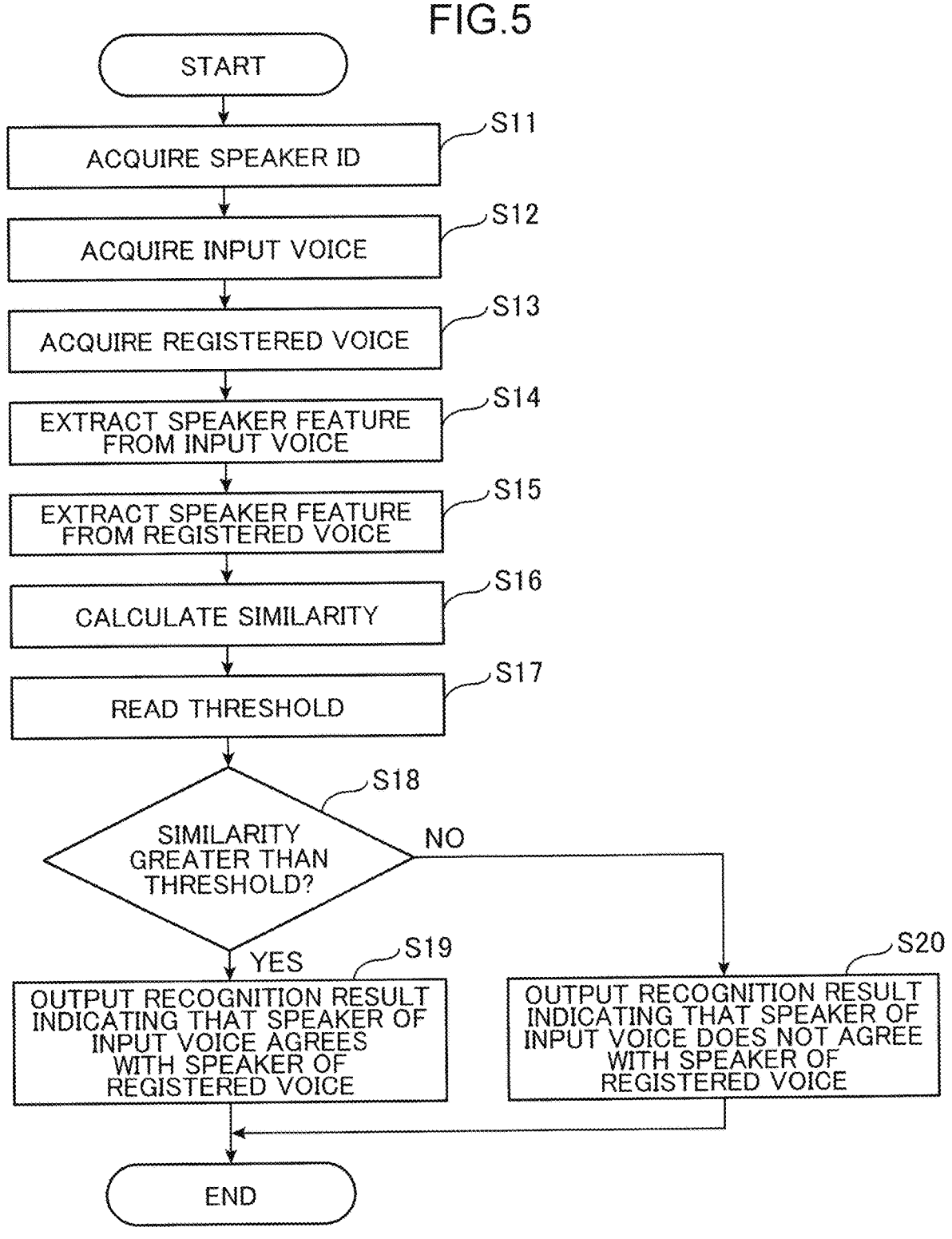
FIG. 5 is a flowchart illustrating operations of a speaker recognition process in the speaker recognition device of the embodiment.

FIG. 5 is a flowchart illustrating the operations of the speaker recognition process in the speaker recognition device 1 of the embodiment.

First, in Step S11, the speaker ID acquisition part 11 acquires a speaker ID for recognition of a speaker who is a target of the recognition. The speaker ID acquisition part 11 outputs the acquired speaker ID to the registered voice acquisition part 12.

Next, in Step S12, the input voice acquisition part 19 acquires an input voice of the speaker who is the target of the recognition via the microphone. The input voice acquisition part 19 outputs the acquired input voice to the third feature extraction part 20.

Next, in Step S13, the registered voice acquisition part 12 acquires a registered voice associated with the speaker ID acquired by the speaker ID acquisition part 11 from the registered voice storage part 18. The registered voice acquisition part 12 outputs the acquired registered voice to the fourth feature extraction part 21.

Next, in Step S14, the third feature extraction part 20 extracts a speaker feature from the input voice acquired by the input voice acquisition part 19. The third feature extraction part 20 outputs the speaker feature extracted from the input voice to the second feature comparison part 22.

Next, in Step S15, the fourth feature extraction part 21 extracts a speaker feature from the registered voice acquired by the registered voice acquisition part 12. The fourth feature extraction part 21 outputs the speaker feature extracted from the registered voice to the second feature comparison part 22.

Next, in Step S16, the second feature comparison part 22 calculates a similarity between the speaker feature extracted from the input voice by the third feature extraction part 20 and the speaker feature extracted from the registered voice by the fourth feature extraction part 21.

Next, in Step S17, the speaker recognition part 23 reads from the registered voice storage part 18 a threshold associated with the speaker ID acquired by the speaker ID acquisition part 11 and the registered voice acquired by the registered voice acquisition part 12.

Next, in Step S18, the speaker recognition part 23 determines whether the similarity calculated by the second feature comparison part 22 is greater than the threshold read from the registered voice storage part 18. When the similarity is determined here to be greater than the threshold (YES in Step S18), in Step S19, the recognition result output part 24 outputs the recognition result indicating that the speaker of the input voice agrees with the speaker of the registered voice.

On the other hand, when the similarity is determined to be equal to or smaller than the threshold (NO in Step S18), in Step S20, the recognition result output part 24 outputs the recognition result indicating that the speaker of the input voice does not agree with the speaker of the registered voice.

As described above, in this embodiment, the registered voice is converted to the property converted voices having respective acoustic properties different from each other, all the pairs of the speaker features of a part or all of the speaker feature extracted from the registered voice and the speaker features extracted from the property converted voices are respectively compared to one another, and the threshold used for recognition of the speaker of the input voice is calculated on the basis of the result of the comparison.

Therefore, even in the case that the similarity between the input voice and the registered voice decreases due to a change in an acoustic property of the input voice of the speaker, the determination as to whether the decrease in the similarity is within a tolerance corresponding to the change in the acoustic property can be made on the basis of the threshold. This makes it possible to attenuate degradation in the speaker recognition performance due to a change in acoustic properties of an input voice of a speaker.

Additionally, property converted voices having acoustic properties different from each other are generated from a registered voice, and the similarity between speaker features extracted from the respective property converted voices is calculated to thereby estimate a variation range in the similarity between the speaker features according to a change in an acoustic property such as a change in the physical condition of the speaker. Therefore, even in the case that the similarity between the registered voice and the input voice decreases due to the change in the acoustic property of the input voice in the speaker recognition process, the determination is made as to whether the decrease in the similarity is tolerable as a change caused by the change in the acoustic property. This enables the execution of a speaker recognition robust to a change in acoustic properties.

In this embodiment, the speaker recognition part 23 determines whether the speaker of the input voice is the speaker of the registered voice. However, the present disclosure is not limited thereto. The determination may be executed as to who is the speaker of an input voice among speakers of registered voices.

In this case, the registered voice storage part 18 stores the registered voices of the respective speakers. In the speaker recognition process, the registered voice acquisition part 12 acquires the registered voices stored in advance from the registered voice storage part 18. The fourth feature extraction part 21 extracts speaker features from the respective registered voices acquired by the registered voice acquisition part 12. The second feature comparison part 22 calculates the similarity between the speaker feature extracted from the input voice and each of the speaker features extracted from the respective registered voices. The speaker recognition part 23 may determine whether the speaker of the input voice is one of the speakers registered in advance by determining whether the greatest similarity among the similarities calculated by the second feature comparison part 22 is greater than a threshold stored in the registered voice storage part 18.

In other words, in a case that the greatest similarity among the similarities calculated by the second feature comparison part 22 is determined to be greater than the threshold stored in the registered voice storage part 18, the speaker recognition part 23 determines that the speaker of the input voice is one of the speakers registered in advance. Further, in a case that the greatest similarity among the similarities calculated by the second feature comparison part 22 is determined to be equal to or smaller than the threshold stored in the registered voice storage part 18, the speaker recognition part 23 determines that the speaker of the input voice is none of the speakers registered in advance. Further, the recognition result output part 24 may output a recognition result as to whether the speaker of the input voice agrees with any one of the speakers of the registered voices.

In this embodiment, in the case that the speaker recognition device 1 recognizes only one speaker registered in advance, the speaker ID is not necessary. Thus, the speaker recognition device 1 may not be provided with the speaker ID acquisition part 11.

Note that, in the above embodiments, each constituent element may be configured with dedicated hardware or may be obtained by executing a software program suitable for each constituent element. Each constituent element may be established by a program execution part, such as a CPU or a processor, reading and executing a software program recorded in recording medium, such as a hard disk or a semiconductor memory. Further, a program may be executed by another independent calculator system by recording the program on storage medium and transferring the program, or by transferring the program via a network.

Part or all of the functions of the device according to the embodiments of the present disclosure are established by a large scale integration (LSI), which is typically an integrated circuit. These may be formed into chips individually, or may be formed into a single chip including a part or the whole. Further, the circuit integration is not limited to LSI, and may be achieved by a dedicated circuit or a general-purpose processor. A field programmable gate array (FPGA) that can be programmed after LSI fabrication, or a reconfigurable processor that can reconfigure connection and setting of circuit cells inside LSI may be used.

Further, part or all of the functions of the device according to the embodiments of the present disclosure may be established by a processor, such as a CPU, executing the program.

Further, all the numbers used above are illustrated to specifically describe the present disclosure, and the present disclosure is not limited to the illustrated numbers.

Further, the order in which the steps shown in the flowchart are performed is illustrated to specifically describe the present disclosure, and may be the order other than the above as long as similar effects can be obtained. Further, part of the above steps may be performed simultaneously (in parallel) with other steps.

The technology according to the present disclosure is useful as the technology for recognizing a speaker of an input voice by comparing the input voice with a registered voice because the technology makes it possible to attenuate a degradation in a speaker recognition performance caused by a change in acoustic properties of the input voice of the speaker.

The invention claimed is:

1. An information processing method, by a computer, comprising:

acquiring a registered voice;

converting the acquired registered voice to a plurality of property converted voices having respective acoustic properties different from each other;

extracting a speaker feature indicative of a characteristic of a speaker from the registered voice;

extracting a speaker feature from each of the property converted voices;

comparing all pairs of speaker features of a part or all of the speaker feature extracted from the registered voice and the speaker features extracted from the property converted voices; and calculating a threshold used for recognition of a speaker of an input voice on the basis of a result of the comparison;

and wherein, in the comparison of all the pairs of speaker features, a similarity between each of all the pairs of speaker features of the part or all of the speaker feature extracted from the registered voice and the speaker features extracted from the property converted voices is calculated, and in the calculation of the threshold, a cumulative distribution function F (x) which indicates a probability of a similarity having a value x or smaller in the calculated similarities is calculated; and a value of a similarity which corresponds to a predetermined probability of the calculated cumulative distribution function F (x) is calculated as the threshold on the basis of the calculated similarities.

2. The information processing method according to claim 1, further comprising:

storing the threshold in a memory in association with the registered voice;

acquiring an input voice of a speaker who is a target of the recognition;

acquiring the registered voice;

extracting a speaker feature from the input voice;

extracting the speaker feature from the registered voice;

calculating a similarity between the speaker feature extracted from the input voice and the speaker feature extracted from the registered voice; and outputting a recognition result indicating that the speaker of the input voice agrees with the speaker of the registered voice when the calculated similarity is greater than the threshold stored in the memory.

3. The information processing method according to claim 1, wherein, in the calculation of the threshold, the smallest similarity among the calculated similarities is determined as the threshold.

4. The information processing method according to claim 1, wherein, in the calculation of the threshold, an average of the calculated similarities is calculated as the threshold.

5. The information processing method according to claim 1, wherein the property converted voices include a first property converted voice resulting from a conversion of a voice quality of the registered voice to a voice quality reflective of a common cold.

6. The information processing method according to claim 1, wherein the property converted voices include a second property converted voice resulting from a conversion of an utterance content expressed by the registered voice to a different utterance content.

7. The information processing method according to claim 1, wherein the property converted voices include a third property converted voice resulting from an addition of a noise to the registered voice.

8. The information processing method according to claim 1, wherein the property converted voices include a fourth property converted voice resulting from a change of an utterance speed of the registered voice to a different utterance speed.

9. The information processing method according to claim 1, wherein the property converted voices include a fifth property converted voice resulting from a conversion of a voice quality of the registered voice to a voice quality representing a certain emotion.

10. An information processing device, comprising:

an acquisition part that acquires a registered voice;

a conversion part that converts the acquired registered voice to a plurality of property converted voices having respective acoustic properties different from each other;

a first extraction part that extracts a speaker feature indicative of a characteristic of a speaker from the registered voice;

a second extraction part that extracts a speaker feature from each of the property converted voices; a comparison part that compares all pairs of speaker features of a part or all of the speaker feature extracted from the registered voice and the speaker features extracted from the property converted voices; and a calculation part that calculates a threshold used for recognition of a speaker of an input voice on the basis of a result of the comparison and wherein, in the comparison of all the pairs of speaker features, a similarity between each of all the pairs of speaker features of the part or all of the speaker feature extracted from the registered voice and the speaker features extracted from the property converted voices is calculated, and in the calculation of the threshold, a cumulative distribution function F (x) which indicates a probability of a similarity having a value x or smaller in the calculated similarities is calculated; and a value of a similarity which corresponds to a predetermined probability of the calculated cumulative distribution function F (x) is calculated as the threshold on the basis of the calculated similarities.

11. A non-transitory computer readable recording medium storing an information processing program causing a computer to:

acquire a registered voice;

convert the acquired registered voice to a plurality of property converted voices having respective acoustic properties different from each other;

extract a speaker feature indicative of a characteristic of a speaker from the registered voice;

extract a speaker feature from each of the property converted voices;

compare all pairs of speaker features of a part or all of the speaker feature extracted from the registered voice and the speaker features extracted from the property converted voices; and calculate a threshold used for recognition of a speaker of an input voice on the basis of a result of the comparison and wherein, in the comparison of all the pairs of speaker features, a similarity between each of all the pairs of speaker features of the part or all of the speaker feature extracted from the registered voice and the speaker features extracted from the property converted voices is calculated, and in the calculation of the threshold, the threshold is calculated a cumulative distribution function F (x) which indicates a probability of a similarity having a value x or smaller in the calculated similarities is calculated; and a value of a similarity which corresponds to a predetermined probability of the calculated cumulative distribution function F (x) is calculated as the threshold on the basis of the calculated similarities.

* * * * *